Feb. 4, 1930.  H. A. McDANIEL  1,745,683

PIPE JOINT

Filed Dec. 20, 1927

Inventor

H. A. McDaniel

By C. A. Snow & Co.

Attorneys.

Patented Feb. 4, 1930

1,745,683

UNITED STATES PATENT OFFICE

HILLERY A. McDANIEL, OF MEXIA, TEXAS

PIPE JOINT

Application filed December 20, 1927. Serial No. 241,345.

This invention aims to provide a novel universal joint adapted primarily, but not exclusively, for use in the piping of cotton ginning systems, the general construction being such that the cotton may pass freely through the joint, and ability to withstand wear being combined with simplicity both in operation and in the manufacture.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

In the drawings:—

Figure 1:
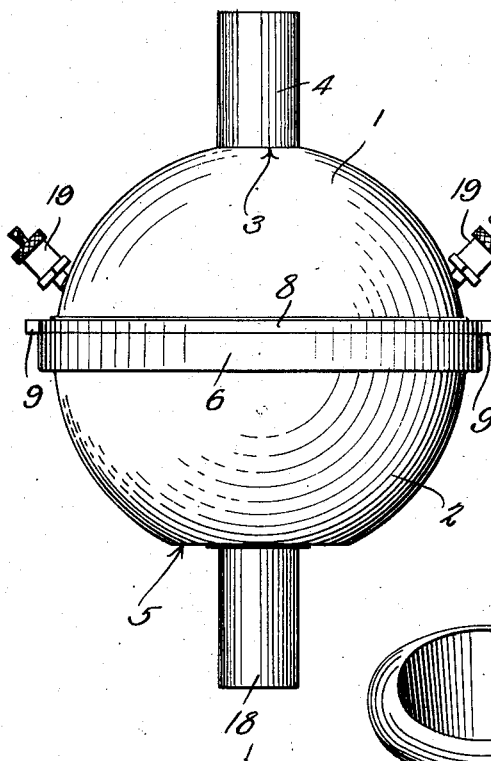
Figure 1 shows in elevation, a device constructed in accordance with the invention.
Figure 2:
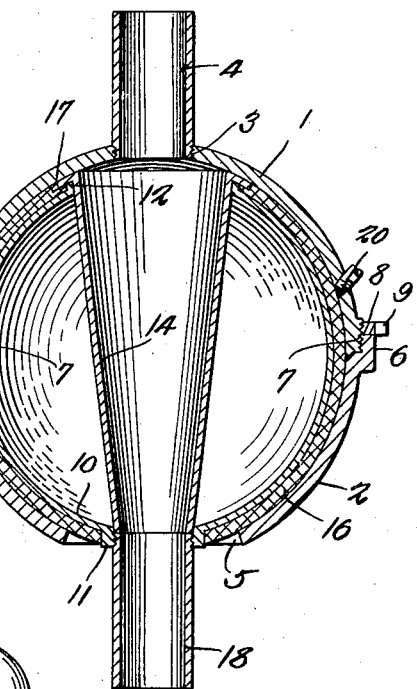
Figure 2 is a section.
Figure 3:
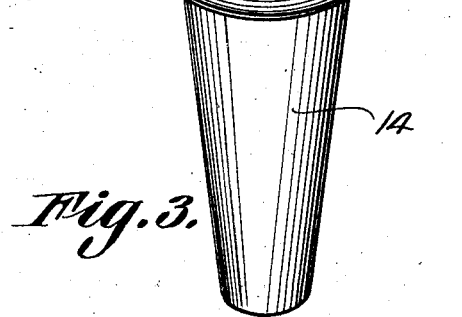
Figure 3 is a perspective view showing the cone.

In carrying out the invention, there is provided a first hemispherical member 1 and a second hemispherical member 2, the member 1 having an opening 3 in which a tube 4 is threaded or secured otherwise. The hemispherical member 2 has an opening 5 which is disposed opposite to the opening 3 in the member 1, the opening 5 being of considerably larger diameter than is the opening 3. A second hemispherical member 2 has an offset annular lip 6 within which is engaged a threaded part 7 on the end of the first hemispherical member 1. A locking ring 8 is threaded on the part 7 on the member 1 and engages the edge of the lip 6 of the member 2, to hold the parts 1 and 2 against accidental separation. The locking ring 8 has lugs 9 whereby it may be manipulated conveniently. The members 1 and 2 preferably are made of rigid metal, and within them is located a spherical body 10 that, also, preferably is made of rigid metal. The body 10 has a projecting collar 11 which moves in the opening 5 of the member 2. The body 10 has a projecting collar 12 located inside of the member 1. The opening in the collar 12 is considerably larger than the opening in the collar 11. The collars 11 and 12 are disposed opposite to each other. A cone 14 is provided and preferably is made of rigid metal. The cone at its wider end is received within the collar 12 of the body 10, the narrower end of the cone being received in the collar 11 of the body 10. At its wider end, the cone 14 has an outstanding flange 15 extended laterally across the edge of the collar 12, the flange 15 being of spherical outline, so that it may fit closely but slidably upon the inner surface of the first hemispherical member 1. A packing 16, of approximately spherical form, is located between the members 1 and 2 on the one hand, and the body 10 on the other hand. The packing 16 fits closely around the collar 11, and is provided with a reduced lip 17 surrounding the collar 12 closely and extending between the flange 15 of the cone 14 and the body 10. This construction is of importance, since it avoids a wear around the edge of the packing 16 where the cone 14 passes through the packing. A tube 18 is threaded into the collar 11 and abuts against the smaller end of the cone 14. For the lubrication of the device, any suitable means may be provided. For instance, there may be dope cups 19 on the member 1, the cups 19 discharging, as indicated at 20 in Figure 2, between the member 1 and the packing 16.

What is claimed is:—

In a device of the class described, first and second hemispherical members, the first member being provided with a tube, and the second member being provided with an opening located opposite to the tube, means for uniting the hemispherical members detachably, a spherical body movable within the first and second members and provided with an opening of greater diameter than the tube and located adjacent to the tube, the body being provided with a tube movable in the opening of the second member, and a cone having its narrower end mounted in the body and in communication with the tube of the body, the wider end of the cone being located in the opening of the body and in communication with the tube of the first member, the wider end of the cone being of greater diameter than the tube of the first member and having a flange extended between the body and the first member, and a packing between the first and second members on the one hand and the body on the other hand, the packing surrounding the tube of the body, and being extended between the body and the flange of the cone.

In testimony that I claim the foregoing as my own, I have hereto affixed my signature.

HILLERY A. McDANIEL.